(12) United States Patent
Miki et al.

(10) Patent No.: US 10,232,905 B2
(45) Date of Patent: Mar. 19, 2019

(54) BICYCLE HYDRAULIC OPERATING DEVICE

(71) Applicant: Shimano Inc., Sakai, Osaka (JP)

(72) Inventors: Yoshimitsu Miki, Osaka (JP); Takafumi Nishino, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/183,673

(22) Filed: Jun. 15, 2016

(65) Prior Publication Data

US 2017/0361897 A1    Dec. 21, 2017

(51) Int. Cl.
*B60T 11/22* (2006.01)
*B62L 3/02* (2006.01)
*B62M 25/04* (2006.01)
*B62K 23/06* (2006.01)

(52) U.S. Cl.
CPC .............. *B62L 3/023* (2013.01); *B62K 23/06* (2013.01); *B62M 25/04* (2013.01)

(58) Field of Classification Search
CPC ........ B60T 11/22; B60T 7/102; B60T 11/165; B60T 11/228; B60T 11/232; B62L 3/023; F15B 7/10
USPC ......................................................... 188/344
See application file for complete search history.

(56) References Cited

U.S. PATENT DOCUMENTS

| | | | |
|---|---|---|---|
| 3,206,933 A * | 9/1965 | Dega ....................... | B60T 11/22 141/346 |
| 5,950,772 A * | 9/1999 | Buckley ................ | B62K 23/06 188/18 A |
| 7,779,718 B2 | 8/2010 | Jordan et al. | |
| 8,448,762 B2 | 5/2013 | Hirose et al. | |
| 8,905,205 B2 | 12/2014 | Matsushita | |
| 9,290,232 B2 | 3/2016 | Snead | |
| 2003/0121736 A1 | 7/2003 | Lumpkin | |
| 2009/0031841 A1 | 2/2009 | Tetsuka | |
| 2009/0205330 A1 * | 8/2009 | Dunlap, III ............. | B60T 7/102 60/584 |
| 2010/0043426 A1 * | 2/2010 | Moore .................... | B60T 11/16 60/594 |
| 2012/0096850 A1 * | 4/2012 | Dunlap, III ............. | B60T 11/22 60/585 |
| 2012/0152673 A1 * | 6/2012 | Wang ...................... | B60T 7/102 188/344 |

(Continued)

FOREIGN PATENT DOCUMENTS

| | | | | |
|---|---|---|---|---|
| DE | 3432287 A1 * | 3/1986 | ............. | B60T 11/22 |
| GB | 2187246 A * | 9/1987 | ............. | B60T 11/22 |

*Primary Examiner* — Bradley T King
*Assistant Examiner* — Stephen M Bowes
(74) *Attorney, Agent, or Firm* — Global IP Counselors, LLP

(57) ABSTRACT

A bicycle hydraulic operating device is basically provided with a base member, a piston, an operating member, a hydraulic reservoir tank and a diaphragm. The base member includes a cylinder bore. The piston is movably disposed in the cylinder bore. The operating member is coupled to the piston to move the piston within the cylinder bore. The hydraulic reservoir tank is fluidly connected to the cylinder bore. The diaphragm is at least partially disposed inside the hydraulic reservoir tank and divides the hydraulic reservoir tank into a hydraulic fluid chamber and an air chamber. The air chamber is at least partially located closer to the cylinder bore than the hydraulic fluid chamber.

18 Claims, 6 Drawing Sheets

(56) References Cited

U.S. PATENT DOCUMENTS

2015/0001018 A1  1/2015 Kariyama et al.
2015/0090112 A1  4/2015 Matsueda et al.
2015/0090550 A1* 4/2015 Matsueda ............... B62L 3/023
                                              188/344

* cited by examiner

BICYCLE HYDRAULIC OPERATING DEVICE

BACKGROUND

Field of the Invention

This invention generally relates to a bicycle hydraulic operating device. More specifically, the present invention relates to a bicycle hydraulic operating device for operating a hydraulically actuated component of a bicycle.

Background Information

Bicycle hydraulic brake systems are typically actuated by a hydraulic brake operating device. The hydraulic brake operating device typically includes a master piston that is slidably disposed in a cylinder bore of a master cylinder, and a brake lever actuating the master piston. The master cylinder contains a hydraulic fluid. The cylinder bore of the master cylinder is in fluid communication with a disc brake caliper housing in the case of a hydraulic disc brake via a fluid conduit. Brake pads of the disc brake caliper housing are typically spaced apart from a rotor by a predetermined gap. The movement of fluid into the caliper housing causes the pistons in the caliper housing to move, and eventually brings the brake pads into contact with a rotor.

SUMMARY

Generally, the present disclosure is directed to various features of a bicycle hydraulic operating device.

In view of the state of the known technology and in accordance with a first aspect of the present disclosure, a bicycle hydraulic operating device is basically provided that comprises a base member, a piston, an operating member, a hydraulic reservoir tank and a diaphragm. The base member includes a cylinder bore. The piston is movably disposed in the cylinder bore. The operating member is coupled to the piston to move the piston within the cylinder bore. The hydraulic reservoir tank is fluidly connected to the cylinder bore. The diaphragm is at least partially disposed inside the hydraulic reservoir tank and divides the hydraulic reservoir tank into a hydraulic fluid chamber and an air chamber. The air chamber is at least partially located closer to the cylinder bore than the hydraulic fluid chamber. According to the first aspect of the present invention, the fluid chamber and the air chamber of the bicycle hydraulic operating device are located such that an inner space of the base member is used effectively.

In accordance with a second aspect of the present invention, a bicycle hydraulic operating device is basically provided that comprises a base member, a piston, an operating member, a hydraulic reservoir tank and a diaphragm. The base member includes a cylinder bore. The piston is movably disposed in the cylinder bore. The operating member coupled to the piston to move the piston within the cylinder bore. The hydraulic reservoir tank is fluidly connected to the cylinder bore. The diaphragm is at least partially disposed inside the hydraulic reservoir tank and defines a hydraulic fluid chamber inside the hydraulic reservoir tank. The diaphragm may define an air chamber inside the hydraulic reservoir tank. The diaphragm has a fluid passage fluidly connecting the hydraulic fluid chamber to the cylinder bore. According to the second aspect of the present invention, the fluid chamber and the air chamber are located such that an inner space of the base member is used effectively.

In view of the state of the known technology and in accordance with a third aspect of the present disclosure, a bicycle hydraulic operating device is basically provided that comprises a base member, a piston, an operating member, a hydraulic reservoir tank and a diaphragm. The base member includes a cylinder bore. The piston is movably disposed in the cylinder bore. The operating member is coupled to the piston to move the piston within the cylinder bore. The hydraulic reservoir tank is fluidly connected to the cylinder bore. The diaphragm is at least partially disposed inside the hydraulic reservoir tank and divides the hydraulic reservoir tank into a hydraulic fluid chamber and an air chamber. The air chamber is at least partially located on an area below the fluid chamber in a state where the bicycle hydraulic operating device is mounted to the bicycle. According to the third aspect of the present invention, the fluid chamber and the air chamber are located such that an inner space of the base member is used effectively.

In accordance with a fourth aspect of the present invention, the bicycle hydraulic operating device according to the first or third aspect is configured so that the diaphragm has a fluid passage fluidly connecting the hydraulic fluid chamber to the cylinder bore. According to the fourth aspect of the present invention, the fluid passage is provided such that an inner space of the base member is used effectively.

In accordance with a fifth aspect of the present invention, the bicycle hydraulic operating device according to the second or fourth aspect is configured so that the hydraulic reservoir tank includes a bleed port that is aligned the fluid passage. According to the fifth aspect of the present invention, the bicycle hydraulic operating device is configured such that a breeding process becomes easy to carry out.

In accordance with a sixth aspect of the present invention, the bicycle hydraulic operating device according to any one of the first to fifth aspects is configured so that the base member includes a recess, and the diaphragm includes a fitting portion that is disposed in the recess of the base member. According to the sixth aspect of the present invention, the diaphragm is effectively positioned.

In accordance with a seventh aspect of the present invention, the bicycle hydraulic operating device according to the sixth aspect is configured so that the base member includes a base fluid passage extending from the cylinder bore to the recess, and the diaphragm has a diaphragm fluid passage extending through the fitting portion, the base fluid passage and the diaphragm fluid passage fluidly connecting the hydraulic fluid chamber to the cylinder bore. According to the seventh aspect of the present invention, the base and diaphragm fluid passages are provided such that an inner space of the base member is used effectively.

In accordance with an eighth aspect of the present invention, the bicycle hydraulic operating device according to the sixth or seventh aspect is configured so that the fitting portion is frictionally retained in the recess of the base member. According to the eighth aspect of the present invention, the diaphragm is more effectively positioned.

In accordance with a ninth aspect of the present invention, the bicycle hydraulic operating device according to any one of the sixth to eighth aspects further comprises a seal member disposed between the recess of the base member and the fitting portion of the diaphragm. According to the ninth aspect of the present invention, the bicycle hydraulic operating device is configured such that reliability of the hydraulic reservoir tank increases.

In accordance with a tenth aspect of the present invention, the bicycle hydraulic operating device according to any one of the first to ninth aspects is configured so that the base member includes an air passageway fluidly connecting the air chamber to outside of the base member. According to the tenth aspect of the present invention, the bicycle hydraulic operating device is configured such that the air chamber works effectively.

In accordance with an eleventh aspect of the present invention, the bicycle hydraulic operating device according to any one of the first to tenth aspects is configured so that the diaphragm is sandwiched in between the base member and the hydraulic reservoir tank to prevent movement of the diaphragm. According to the eleventh aspect of the present invention, the bicycle hydraulic operating device is configured such that reliability of the hydraulic reservoir tank increases.

In accordance with a twelfth aspect of the present invention, the bicycle hydraulic operating device according to the eleventh aspect is configured so that the diaphragm includes a peripheral edge portion that is sandwiched in between the base member and the hydraulic reservoir tank. According to the twelfth aspect of the present invention, the bicycle hydraulic operating device is configured such that the diaphragm is easily positioned.

In accordance with a thirteenth aspect of the present invention, the bicycle hydraulic operating device according to any one of the first to twelfth aspects is configured so that the hydraulic reservoir tank is bonded to the base member. According to the thirteenth aspect of the present invention, the bicycle hydraulic operating device is configured such that the reservoir tank is easily provided on the base member.

In accordance with a fourteenth aspect of the present invention, the bicycle hydraulic operating device according to any one of the first to thirteenth aspects is configured so that the hydraulic reservoir tank is fixed to the base member by a fastenerless joint. According to the fourteenth aspect of the present invention, the bicycle hydraulic operating device is configured such that the reservoir tank is more easily provided on the base member.

In accordance with a fifteenth aspect of the present invention, the bicycle hydraulic operating device according to any one of the first to fourteenth aspects is configured so that the hydraulic reservoir tank and the base member are made of a resin material. According to the fifteenth aspect of the present invention, the bicycle hydraulic operating device is configured such that the base member and the reservoir tank are easily provided as lightweight portions for reducing an overall weight of the bicycle hydraulic operating device.

In accordance with a sixteenth aspect of the present invention, the bicycle hydraulic operating device according to any one of the first to fifteenth aspects further comprises a handlebar mounting structure disposed on the base member. According to the sixteenth aspect of the present invention, the bicycle hydraulic operating device is configured such that the base member can be effectively located for easy use by a rider.

In accordance with a seventeenth aspect of the present invention, the bicycle hydraulic operating device according to any one of the first to sixteenth aspects is configured so that the operating member includes a lever pivotally mounted relative to the base member. According to the seventeenth aspect of the present invention, the operating member is configured as a lever so that the operating member can be easily operated by a rider.

In accordance with an eighteenth aspect of the present invention, the bicycle hydraulic operating device according to any one of the first to seventeenth aspects is configured so that the base member is configured to be gripped by a user. An inner space of the base member is limited since the base member is configured to be gripped by a user. According to the eighteenth aspect of the present invention, the bicycle hydraulic operating device is configured such that the small inner space of the base member is used effectively.

In accordance with a nineteenth aspect of the present invention, the bicycle hydraulic operating device according to any one of the first to eighteenth aspects is configured so that the base member includes a handlebar receiving recess arranged at a first end portion and a pommel portion arranged at a second end portion opposite to the first end portion. According to the nineteenth aspect of the present invention, the bicycle hydraulic operating device is configured such that the base member can be effectively located for easy use by a rider.

In accordance with a twentieth aspect of the present invention, the bicycle hydraulic operating device according to any one of the first to nineteenth aspects further comprises a shifting unit that is disposed on one of the base member and the operating member. According to the twentieth aspect of the present invention, the bicycle hydraulic operating device is configured to be used to perform a shifting function in addition to the braking function.

Also other objects, features, aspects and advantages of the disclosed bicycle hydraulic operating device will become apparent to those skilled in the art from the following detailed description, which, taken in conjunction with the annexed drawings, discloses one embodiment of the bicycle hydraulic operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
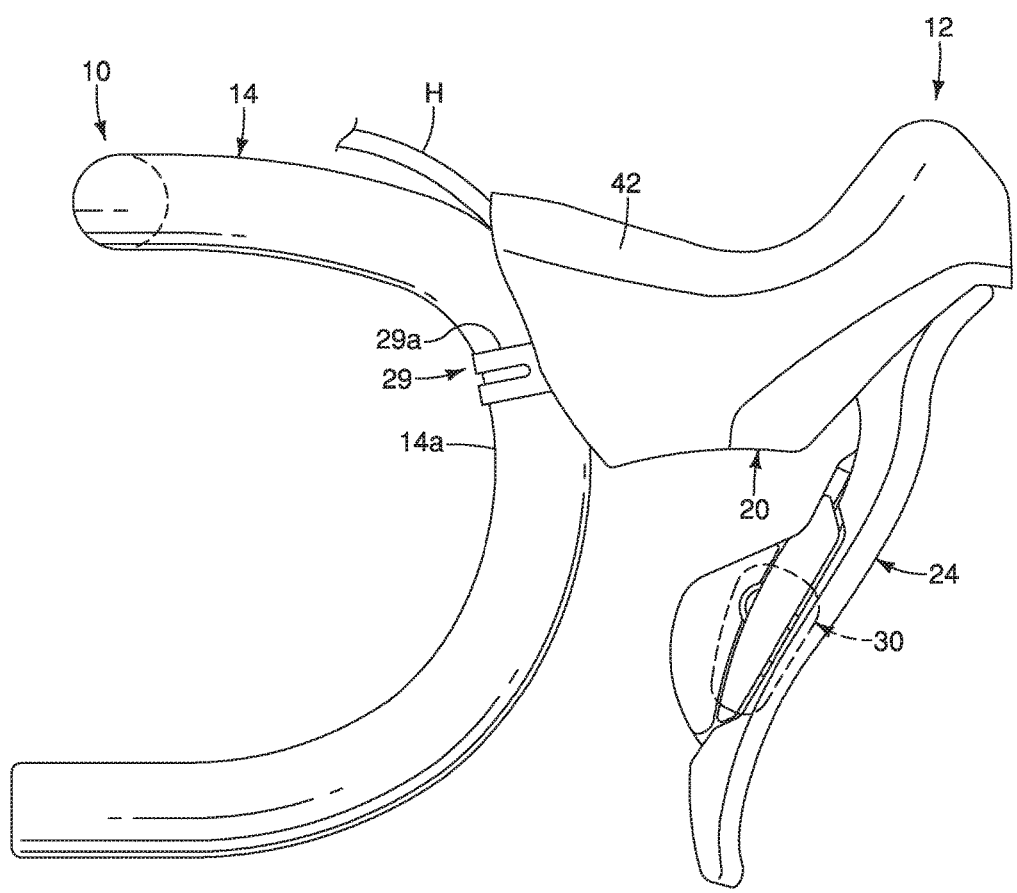
FIG. 1 is an outside elevational view of a portion of a bicycle equipped with a bicycle hydraulic operating device in accordance a first illustrated embodiment in which the bicycle operating device is coupled to a drop handlebar in an installed position.
Figure 2:
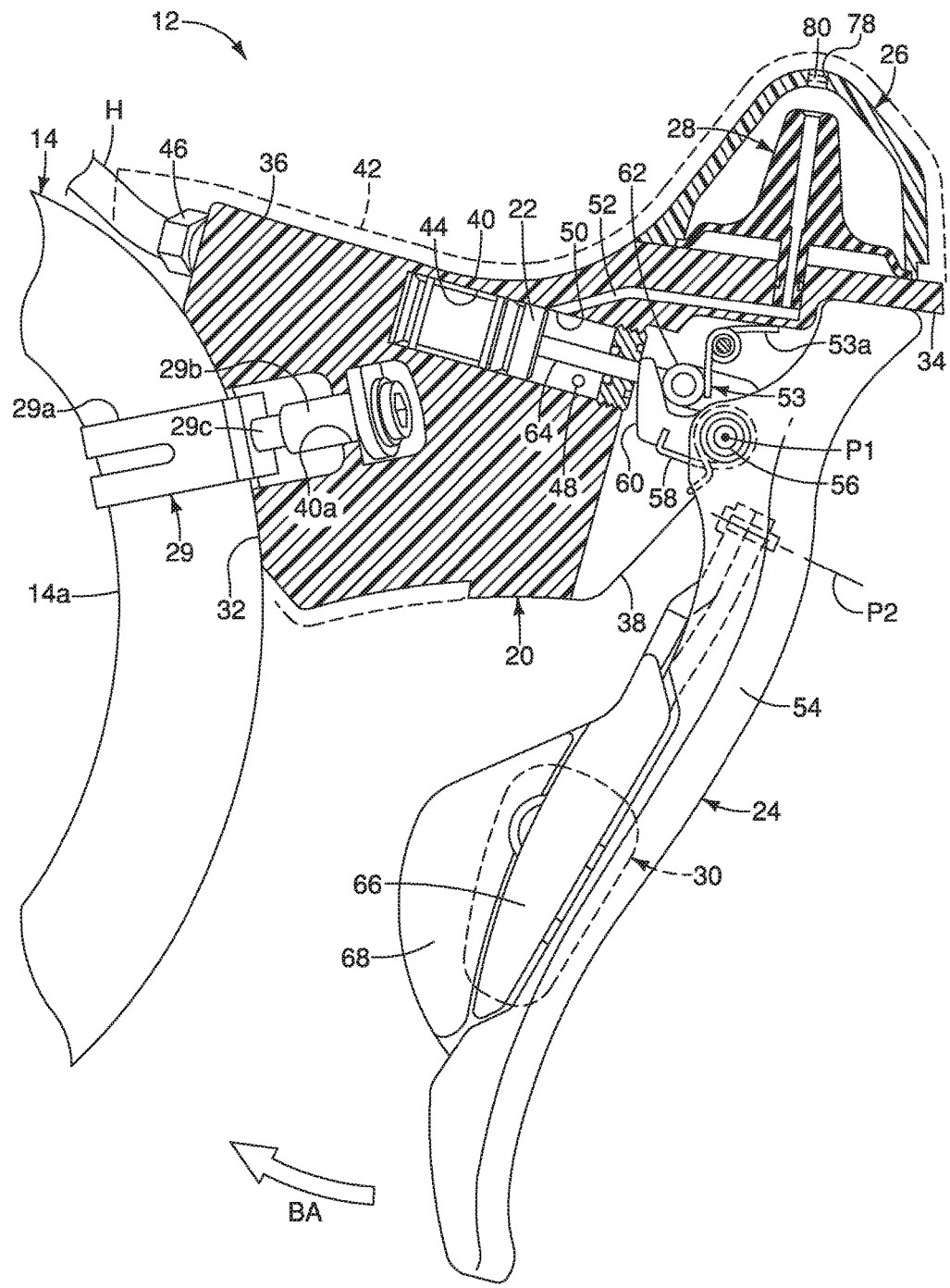
FIG. 2 is a longitudinal cross sectional view of the bicycle hydraulic operating device illustrated in FIG. 1 with operating members in their rest positions (non-operated position)

Referring initially to FIGS. 1 and 2, a bicycle 10 is illustrated that is equipped with a bicycle hydraulic operating device 12 in accordance with a first embodiment. the bicycle hydraulic operating device 12 is a right hand side control device operated by the rider's right hand to operate a first brake device (not shown) and a first gear shifting device (not shown, e.g., an electric rear derailleur). It will be apparent to those skilled in the bicycle field that the configuration of the bicycle hydraulic operating device 12 can be adapted to a left hand side control device that is operated by the rider's left hand.

As seen in FIGS. 1 and 2, the bicycle hydraulic operating device 12 is mounted a drop handlebar 14. In particular, the bicycle hydraulic operating device 12 is mounted to a curved section 14a of the drop handlebar 14. In other words, the bicycle hydraulic operating device 12 is particularly designed for a bicycle that is equipped with the drop handlebar 12. As explained below, the bicycle hydraulic operating device 12 includes both a braking function and a shifting function in a single unit. However, it will be apparent to those skilled in the bicycle field from this disclosure that the shifting function could be eliminated from the bicycle hydraulic operating device 12 if needed and/or desired. The bicycle hydraulic operating device 12 is a bicycle hydraulic brake operating device that is specifically designed to be mounted to the curved section 12a of the drop handlebar 12.

In the first embodiment, the bicycle hydraulic operating device 12 is a bicycle brake/shift device, which is also known as a bicycle brifter. A bicycle brifter is a device that includes both a braking function and a shifting function in a single unit that is mounted to the bicycle. A bicycle dropdown brifter is a device that is specifically configured to be mounted to the curved section 14a of the drop handlebar 14, as illustrated in FIG. 1, and that includes both braking and shifting functions in a single unit.

As illustrated in FIG. 2, the bicycle hydraulic operating device 12 basically comprise a base member 20, a piston 22, an operating member 24, a hydraulic reservoir tank 26, and a diaphragm 28. The diaphragm 28 is at least partially disposed inside the hydraulic reservoir tank 26. The diaphragm 28 divides the hydraulic reservoir tank 26 into a hydraulic fluid chamber C1 and an air chamber C2.

As seen in FIGS. 1 and 2, the bicycle hydraulic operating device 12 further comprises a handlebar mounting structure 29 that is disposed on the base member 20. Preferably, the bicycle hydraulic operating device 12 further comprises a shifting unit 30 that is disposed on one of the base member 20 and the operating member 24. In the first embodiment, the shifting unit 30 is disposed on the operating member 24.

As illustrated in FIG. 2, the base member 20 includes a handlebar receiving recess 32 and a pommel portion 34. The handlebar receiving recess 32 is arranged at a first end portion 36. The pommel portion 34 is arranged at a second end portion 38 that is opposite to the first end portion 36. The hydraulic reservoir tank 26 is provided on the second end portion 38 of the base member 20 to form at least a part of the pommel portion 34. The base member 20 defines a drop handlebar bracket, which is made of a suitable rigid, hard material such as a hard plastic material (e.g., resin), a fiber reinforced plastic material (e.g., resin), a metallic material, etc. The base member 20 is configured to be gripped by a user. Thus, the base member 20 includes a grip portion 40 that is located at a middle portion of the drop handlebar bracket. In this first embodiment, the base member 20 essentially consists of a one-piece, unitary member. Of course, the base member 20 can include removable panels as needed and/or desired.

The handlebar mounting structure 29 is attached to the base member 20 at the handlebar receiving recess 32. The handlebar mounting structure 29 and the handlebar receiving recess 32 cooperate together to non-movably attach the base member 20 to the curved section 14a of the drop handlebar 14. In other words, the handlebar mounting structure 29 is a conventional handlebar clamp that is attached to the base member 20 for releasably securing the base member 20 to the curved section 14a of the drop handlebar 14. The handlebar mounting structure 29 basically includes a clamping band 29a (i.e., a handlebar clamping member) and a first fastener part 29b (nut) that screws unto a second fastener part 29c (bolt) of the clamping band 29a. The first and second fastener parts 29b and 29c are located in a hole 40a of the grip portion 40. In this way, in this first embodiment, the handlebar mounting structure 29 is disposed on the base member 20. With the handlebar mounting structure 29, a head of the first fastener part 29b applies a first force on the base member 20 and a head of the second fastener part 29c applies a second force on the clamping band 29a when the handlebar mounting structure 29 is tightened to secure the base member 20 to the curved section 14a of the drop handlebar 14. By tightening the first fastener part 29b, the clamping band 29a is moved toward the base member 20 such that the curved section 14a of the drop handlebar 14 is squeezed between the clamping band 29a and the base member 20. It will be apparent to those skilled in the bicycle field that the handlebar mounting structure 29 that is not limited to the illustrated clamp, but rather other suitable attachment mechanisms can be used as needed and/or desired. In any case, the handlebar mounting structure 29 is mounted on the base member 20 in the first embodiment.

As illustrated in FIG. 1, the bicycle hydraulic operating device 12 further comprises a cover 42 that is stretched over at least the grip portion 40 and the pommel portion 34, which includes the hydraulic reservoir 26, to provide a cushion to the grip portion 40 of the base member 20 and to provide an attractive appearance. Typically, the cover 38 is made of elastic material such as rubber. The cover 42 is also often referred to as a grip cover.

The base member 20 includes a cylinder bore 44. The piston 22 is movably disposed in the cylinder bore 44. The piston 22 and the internal surface of the cylinder bore 44 define a hydraulic cylinder chamber. As illustrated in FIG. 2, the cylinder bore 44 is directly formed by the base member 20. The cylinder bore 44 can be formed, for example, by cutting the bracket 12 or die molding of the base member 20. The cylinder bore 44 is formed in a cylindrical shape. However, it will be apparent from this disclosure that an insert can be provided to the base member 20 to form the cylinder bore 44. A hydraulic hose connector 46 is screwed into the base member 20 to fluidly connect a hydraulic hose H to a hydraulic fluid channel (not shown) that connects the hose connector 46 to an outlet port 48 of the hydraulic cylinder chamber. The cylinder bore 44 also has an inlet port 50 that is fluidly connected to the hydraulic reservoir tank 26 by a base fluid passage 52.

The operating member 24 is coupled to the piston 22 to move the piston 22 within the cylinder bore 44. Thus, the piston 22 moves in the cylinder bore 44 in a reciprocal manner in response to operation of the operating member 24. In particular, the piston 48 moves linearly within the cylinder bore 44 (i.e., reciprocates linearly within the cylinder bore 44) to force the hydraulic fluid out of the outlet port 48 of the hydraulic chamber to a brake device via the hydraulic hose H. Thus, the piston 22, the operating member 24, the hydraulic reservoir tank 26 and the cylinder bore 44 constitute a hydraulic brake unit.

In this first embodiment, a biasing element 53 is provided for biasing the piston 22 to a rest position in which the hydraulic cylinder chamber has the largest volume. In the first illustrated embodiment, as seen in FIG. 4, the biasing element 53 is a pair of coil torsion springs 53a (return springs).

Figure 3:
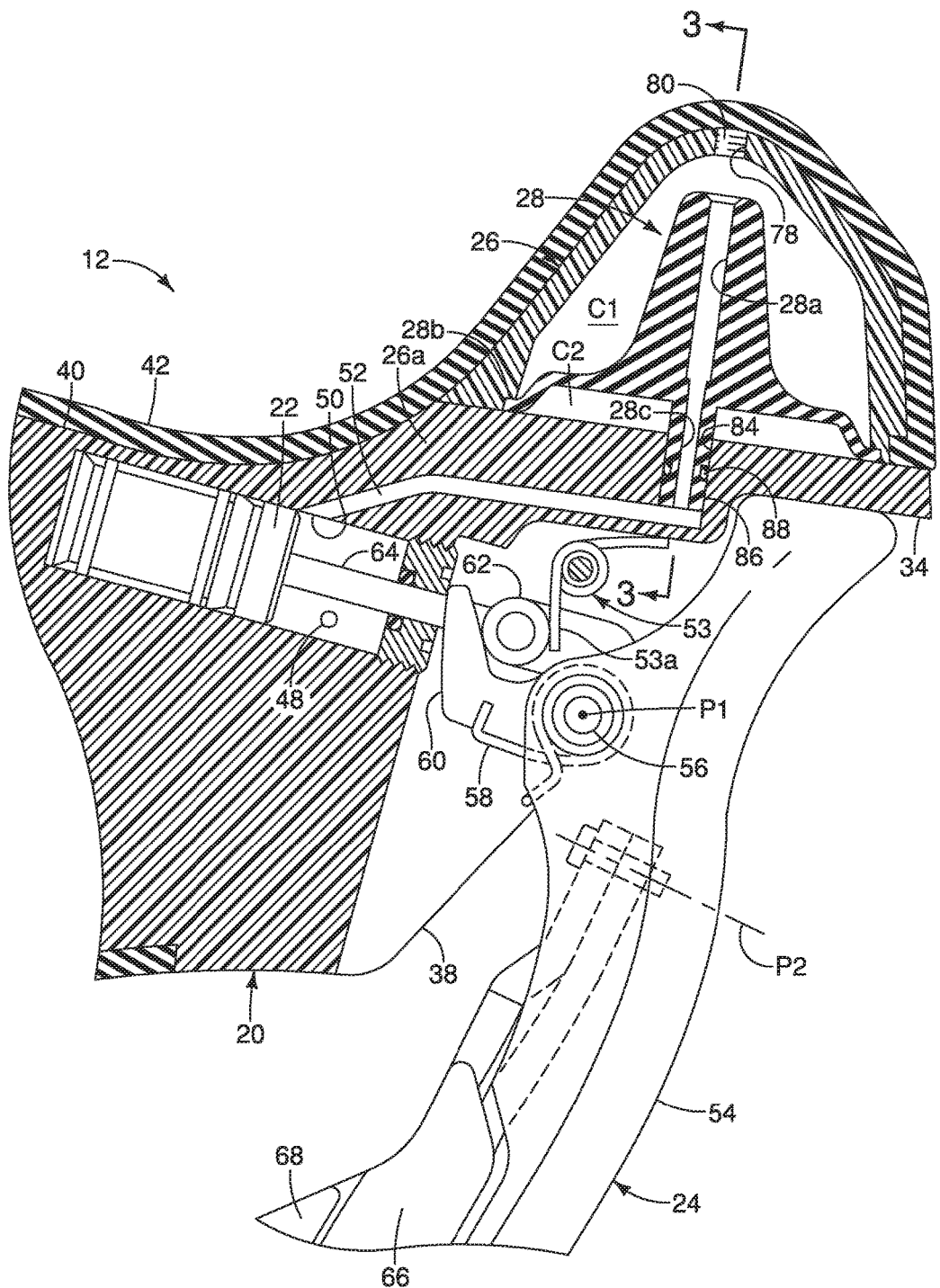
FIG. 3 is an enlarged, partial cross sectional view of a portion of the bicycle hydraulic operating device illustrated in FIGS. 1 and 2.

As illustrated in FIG. 3, the operating member 24 includes a lever 54 that is pivotally mounted relative to the base member 20. The lever 54 is directly pivotally mounted to the base member 20 by a pivot pin 56 that defines a pivot axis P1. The lever 54 is an elongated operating (brake) lever that is operatively coupled to the piston 22 for performing a bicycle braking operation. The lever 54 is biased to a rest position with respect to the base member 20 by a biasing element 58. The operating member 24 further includes an actuation cam 60 that operatively connects the piston 22 to the lever 54. The biasing element 58 is operatively coupled between the lever 54 and the actuation cam 60 to bias the lever 54 and the actuation cam 60 in opposite directions about the pivot axis P1. In this way, the lever 54 is biasing against the base member 20 to establish a rest position of the operating member 24, and the actuation cam 60 biased into engagement with a pair of rollers 62 on a connecting rod 64 that is attached to the piston 22. The term "rest position" as used herein refers to a state in which the part (e.g., the operating member 24) remains stationary without the need of a user holding the part in that state corresponding to the rest position. Thus, the lever 54 moves relative to the base member 20 from the rest position along a brake operating path BA (FIG. 2) to a braking position for performing a braking operation of a brake device (not shown).

In the first embodiment, the lever 54 is provided with a pair of gearshift operating parts 66 and 68 for performing gear shifting operations of a gear changing device (not shown). The gearshift operating parts 66 and 68 are electrically connected to the shift unit 30 that is mounted within a recess in the base member 20. The gearshift operating parts 66 and 68 are pivotally mounted on the lever 54 to pivot about a pivot axis P2. The shift unit 30 and the gearshift operating parts 66 and 68 are constructed as shown in U.S. Patent Application Publication No. 2009/0031841 A1 (assigned to Shimano, Inc.). It will be apparent to those skilled in the bicycle field that the shift unit 30 and the gearshift operating parts 66 and 68 that are not limited to the illustrated structure and arrangement, but rather other suitable structures and arrangements can be used as needed and/or desired. Here, the shift unit 30 is an electrical shift unit that includes a microcomputer with a processor and a pair of electrical switches (e.g. press type contact switches or a normally open contactless switches). Alternatively, the processor of the shift unit 30 can be located in the base member 20 or remotely located from the bicycle hydraulic operating device 12 if needed and/or desired. Since various electrical shifting systems such as the one illustrated herein are known in the bicycle field, shift unit 30 and the gearshift operating parts 66 and 68 will not be discussed herein for the sake of brevity.

Figure 4:
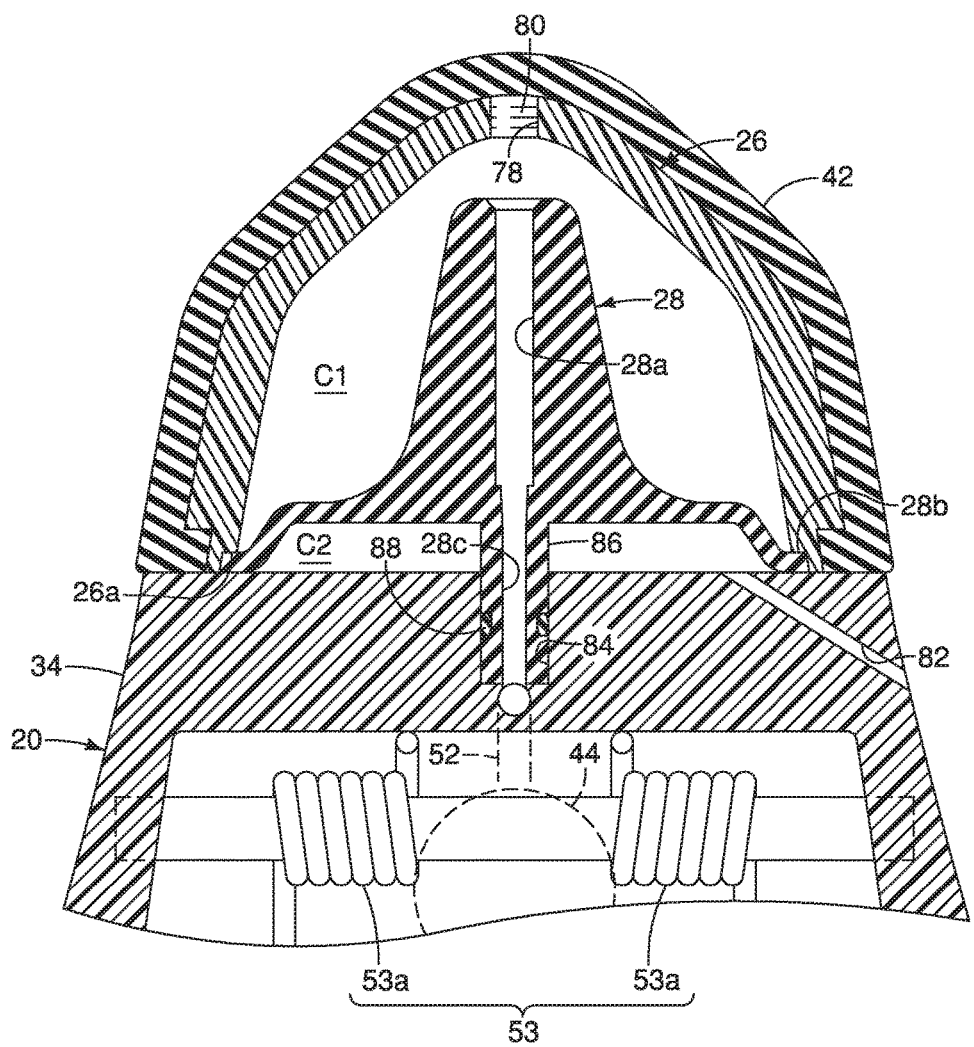
FIG. 4 is an enlarged, partial transverse cross sectional view of a portion of the bicycle hydraulic operating device illustrated in FIGS. 1 to 3 as seen along section line 4-4 of FIG. 3.
Figure 5:
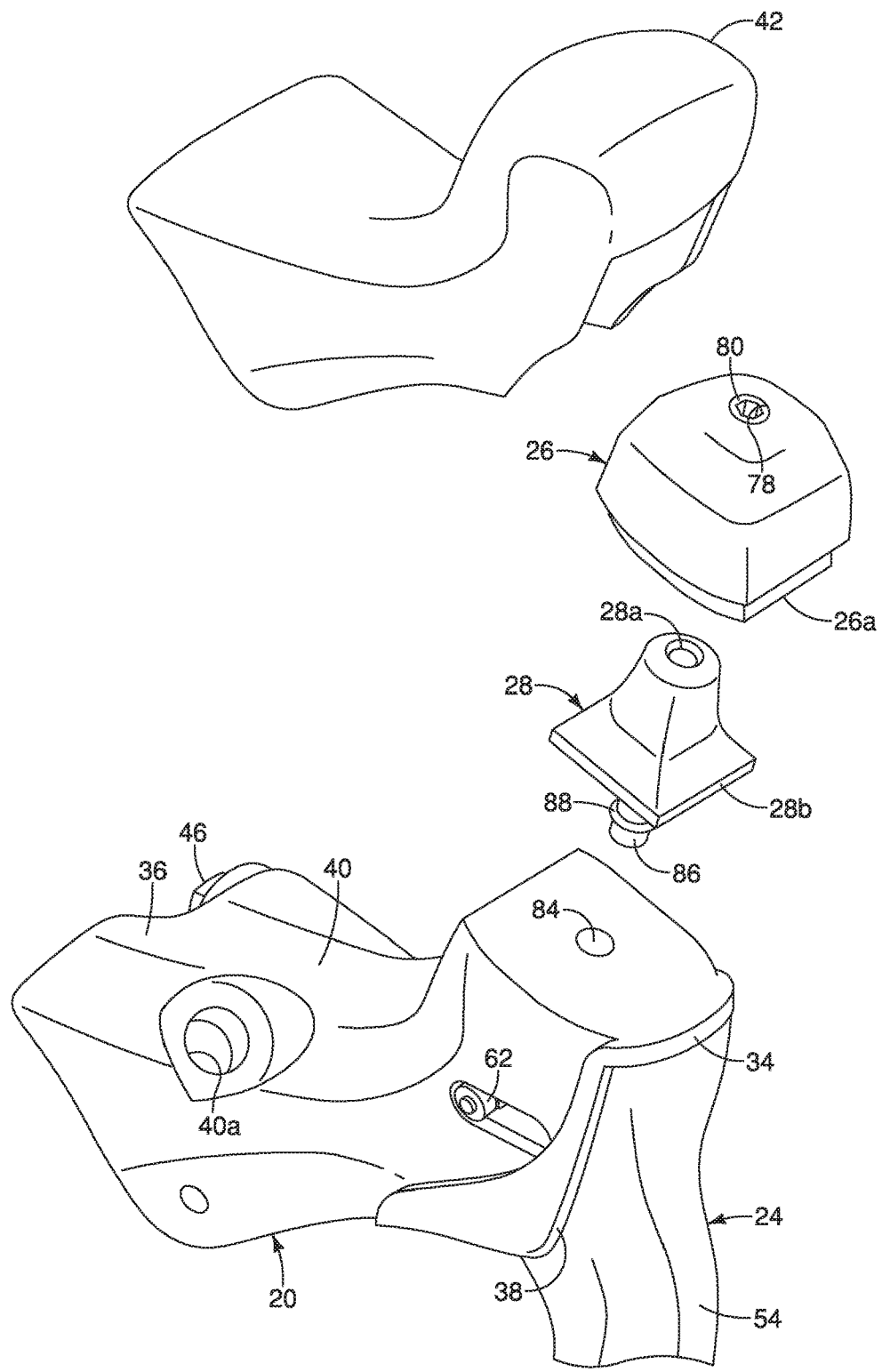
FIG. 5 is a perspective view of selected parts of the bicycle hydraulic operating device illustrated in FIGS. 1 to 4.

As seen in FIGS. 3 to 5, the hydraulic reservoir tank 26 is a separate part that is integrally fixed to the base member 20. The hydraulic reservoir tank 26 provides hydraulic fluid to the hydraulic cylinder chamber that is defined by the space formed between the piston 22 and the internal surface of the cylinder bore 44 in the base member 20. The hydraulic reservoir tank 26 is provided so that the necessary amount of hydraulic fluid can be injected from the hydraulic reservoir tank 26 even if the friction material (for example, a brake pad) of the braking device becomes worn. In particular, the amount of hydraulic fluid needed in the hydraulic cylinder chamber increase as the friction material of the braking device becomes worn. Also, the hydraulic reservoir tank 26 prevents inconsistencies in the pressure being applied to the braking device due to swelling and contraction caused by changes in the temperature of the hydraulic fluid. Hydraulic pressure is generated through the movement of the piston 22 in response to operation of the lever 54.

The hydraulic reservoir tank 26 is made of a suitable rigid, hard material such as a hard plastic material (e.g., resin), a fiber reinforced plastic material (e.g., resin), a metallic material, etc. However, preferably, the hydraulic reservoir tank 26 and the base member 20 are made of a resin material. In this way, the hydraulic reservoir tank 26 is bonded to the base member 20 by using a suitable adhesive and/or heat welding. In the first embodiment, preferably, the hydraulic reservoir tank 26 is fixed to the base member 20 by a fastenerless joint 76. The term "fastenerless joint" as used herein means a joint between two parts that is accomplished without using mechanical fasteners, such as but not limited to rivets or bolts, screws. The type of fastenerless joint will partly depend on the materials of the hydraulic reservoir tank 26 and the base member 20. Some examples of fastenerless joints include adhesive bonding, pressure-sensitive tapes, soldering, ultrasonic plastic welding, ultrasonic metal welding, plastic to plastic fusing, metal to metal arc welding, and laser welding. Thus, the fastenerless joint 76 can be made without a binder material, such as an adhesive or a filler, or can be made with such a binder material.

Referring to FIGS. 3 and 4, the hydraulic reservoir tank 26 is fluidly connected to the cylinder bore 44. In particular, the base fluid passage 52 fluidly connects hydraulic reservoir tank 26 to the cylinder bore 44. As seen in FIG. 3, the hydraulic reservoir tank 26 includes a bleed port 78 for bleeding air from the hydraulic fluid chamber C1. The bleed port 78 can also be used for adding hydraulic fluid to the hydraulic fluid chamber C1. The bleed port 78 is closed by a bleed screw 80. Thus, the bleed port 78 has an internal thread for screwing the bleed screw 80 into the bleed port 78.

Referring to FIGS. 3 and 4, the diaphragm 28 is a flexible, resilient member made of a suitable material such as a rubber material. The diaphragm 28 is a unitary, one-piece member. As mentioned above, the diaphragm 28 divides the hydraulic reservoir tank 26 into the hydraulic fluid chamber C1 and the air chamber C2. Thus, the diaphragm 28 is disposed inside the hydraulic reservoir tank 26 and defines the hydraulic fluid chamber C1 inside the hydraulic reservoir tank 26. The base member 20 includes an air passageway 82 that fluidly connects the air chamber C2 to outside of the base member 20. The diaphragm 28 has a fluid passage 28a that fluidly connects the hydraulic fluid chamber C1 to the cylinder bore 44. Here, in the first embodiment, the bleed port 78 is aligned the fluid passage 28a.

The air chamber C2 is at least partially located between the cylinder bore 44 and the hydraulic fluid chamber C1. In other words, the air chamber C2 is at least partially between the cylinder bore 44 and the hydraulic fluid chamber C1 if the air chamber C2 is at least partially located along a fluid passage extending between the hydraulic fluid chamber C1 and the cylinder bore 44. Accordingly, in the first embodiment, the cylinder bore 44 is not directly beneath (offset from) the hydraulic fluid chamber C1, but the air chamber C2 is still considered to be at least partially located between the cylinder bore 44 and the hydraulic fluid chamber C1 because the air chamber C2 is located along a fluid passage extending between the hydraulic fluid chamber C1 and the cylinder bore 44. As a result, the air chamber C2 is at least partially located closer to the cylinder bore 44 than the hydraulic fluid chamber C1. Further, the air chamber C2 is at least partially located at an area below the hydraulic fluid camber C1 in a state (i.e., an installed state) where the bicycle hydraulic operating device 12 is mounted to the bicycle 10 (i.e., the drop handlebar 14 in this first embodiment). While the air chamber C2 is illustrated directly beneath the hydraulic fluid chamber C1, it will be apparent from this disclosure that the air chamber C2 can be located in an area that is not directly beneath (offset from) the hydraulic fluid chamber C1, but the air chamber C2 is still considered to be in an area that is below the hydraulic fluid chamber C1 while in an installed state.

The diaphragm 28 is sandwiched in between the base member 20 and the hydraulic reservoir tank 26 to prevent movement of the diaphragm 28. In particular, the diaphragm 28 includes a peripheral edge portion 28b that is sandwiched in between the base member 20 and the hydraulic reservoir tank 26. Also the base member 20 includes a recess 84. The diaphragm 28 includes a fitting portion 86 that is disposed in the recess 84 of the base member 20. Here, in the first embodiment, the fitting portion 86 is integrally formed with the rest of the diaphragm 28. However, the fitting portion 86 can be a separate piece that is attached to the diaphragm 28. The bicycle hydraulic operating device 12 further comprising a seal member 88 that is disposed between the recess 84 of the base member 20 and the fitting portion 86 of the diaphragm 28. As a result, the interface between the recess 84 of the base member 20 and the fitting portion 86 is sealed, and the fitting portion 86 is frictionally retained in the recess 84 of the base member 20. The base fluid passage 52 extends from the cylinder bore 44 to the recess 84. Thus, the diaphragm 28 has a diaphragm fluid passage 28c extending through the fitting portion 86. The diaphragm fluid passage 28c is an extension of the fluid passage 28a such that the fluid passage 28a and the diaphragm fluid passage 28c form a continuous fluid channel. The base fluid passage 52 and the diaphragm fluid passage 28c fluidly connects the hydraulic fluid chamber C1 to the cylinder bore 44 via the fluid passage 28a.

In the first embodiment, preferably, the hydraulic reservoir tank 26 has an open bottom defined by a peripheral edge 26a that is fixed to the base member 20 by the fastenerless joint. Here, in the first embodiment, the hydraulic reservoir tank 26 is free of a bottom wall and is free of hidden surfaces. In other words, the hydraulic reservoir tank 26 has only non-hidden surfaces. In this way, the hydraulic reservoir tank 26 can be integrally molded as one-piece, unitary member using straight, draw-type molds that have no undercut (hidden) surfaces, (i.e., with only non-hidden surfaces). The phrase "hidden surface(s)" as used in this disclosure refers to a surface or surfaces of a molded part which does not directly face a straight draw-type mold. In other words, a hidden surface or an undercut surface is a surface which faces another surface of the molded part such that a pair of straight draw-type molds cannot be used to form the hidden surface. The phrase "draw-type injection molding" as used herein refers to the use of an injection mold comprised of two halves which are separated from each other by moving each half of the mold apart from the other along a straight line to create an injection molded part without the use of mold sliders to create hidden or undercut surfaces.

Figure 6:
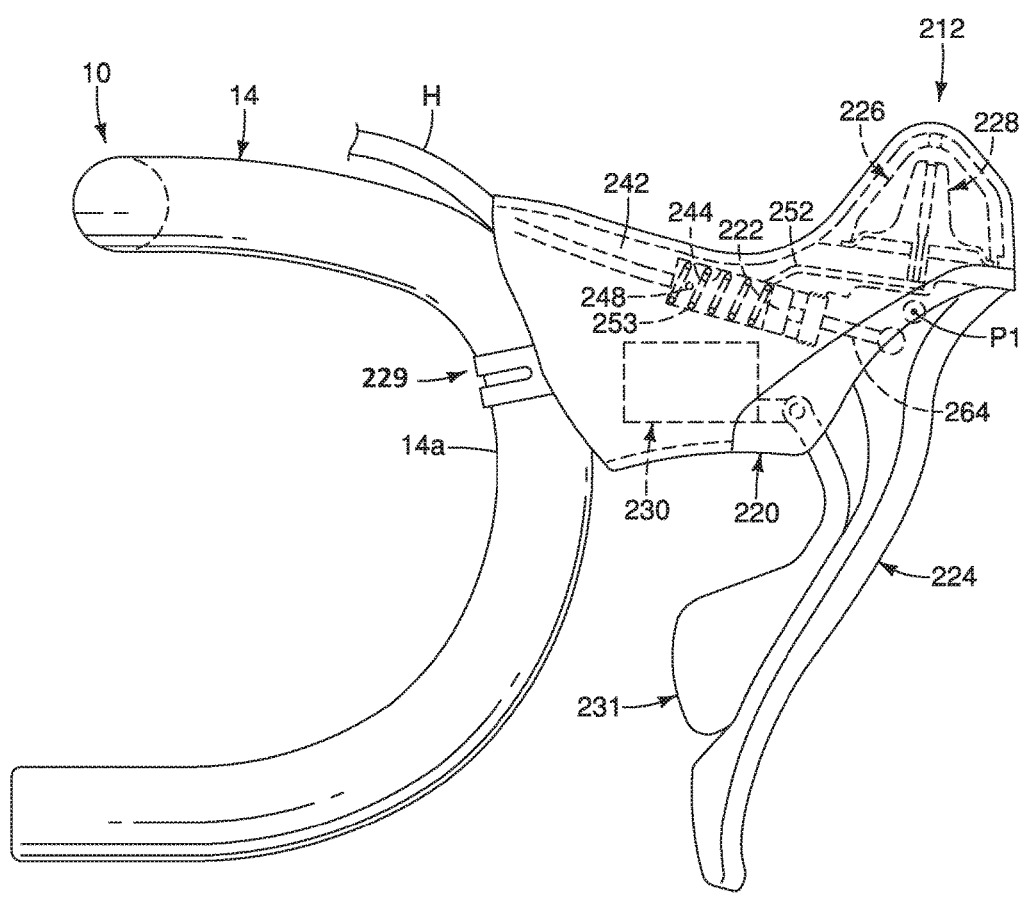
FIG. 6 is an outside elevational view of a bicycle hydraulic operating device in accordance a second embodiment in which the bicycle operating device is coupled to the drop handlebar in an installed position.

Referring now to FIG. 6, a bicycle hydraulic operating device 212 is illustrated in accordance with a second embodiment. The bicycle hydraulic operating device 12 basically comprises a base member 220, a piston 222, an operating member 224, a hydraulic reservoir 226 and a diaphragm 228. The bicycle hydraulic operating device 12 further comprises a handlebar mounting structure 229 that is disposed on the base member 220. Preferably, the bicycle hydraulic operating device 212 further comprises a shifting unit 230 that is disposed on the base member 220. The hydraulic reservoir 226 is fluidly connected to a cylinder bore 244 that is formed in the base member 220. The cylinder bore 244 has an outlet port 248 that is fluidly connected to the hose H. Also, a fluid passage 252 extends between the hydraulic reservoir 226 and the cylinder bore 244 for supplying hydraulic fluid from the hydraulic reservoir 226 to the cylinder bore 244. The hydraulic reservoir 226 is identical to the hydraulic reservoir 226.

The shifting unit 230 is a mechanical shifting unit that basically has the same structure and operates in the same way as the so called holding mechanism that is disclosed in U.S. Pat. No. 7,779,718. However, the shifting unit 230 has been configured to be supported by the base member 220 and operated by a control cable (e.g., Bowman cable). In other words, the shifting unit 230 is operated by a control lever 231 in the same manner as the control lever for the so called holding mechanism that is disclosed in U.S. Pat. No. 7,779,718. Since the structure and operations of the shifting unit 230 are well known to those skilled in the bicycle field, the structure and operations of the shifting unit 230 will not be discussed in detail herein.

In the third embodiment, the piston 222 and the operating member 224 are configured as a piston push-type hydraulic actuator. Here, a biasing element 253 is provided for biasing the piston 22 to a rest position in which the hydraulic cylinder chamber has the largest volume. In the third embodiment, the biasing element 253 is a compression spring. The biasing element 253 is also used to biasing the operating member 224 to a rest position. In particular, the piston 222 is operatively coupled to the operating member 224 by a connecting rod 264. Thus, the biasing force of the biasing element 253 is transmitted to the operating member 224 via the connecting rod 264. Preferably, the connecting rod 264 has a first end pivotally coupled to the piston 222 and a second end pivotally coupled to the operating member 224.

Here, the operating member 224 is pivotally mounted on the base member 220 to pivot about the pivot axis P1 such that operation of the operating member 224 from the rest position to an operated position about the pivot axis P1 causes the piston 222 to be pushed inside of the cylinder bore 244. Thus, hydraulic fluid is forced out of the cylinder bore 244 via the outlet port 248 to the brake device (not shown). Since the piston push-type hydraulic actuators are known in the bicycle field, the piston push-type hydraulic actuator of the bicycle hydraulic operating device 212 will not be discussed or illustrated in detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle hydraulic operating device. Accordingly, these directional terms, as utilized to describe the bicycle hydraulic operating device should be interpreted relative to a bicycle in an upright riding position on a horizontal surface and that is equipped with the bicycle hydraulic operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic operating device comprising:
    a base member including a cylinder bore, a recess, and a base fluid passage extending from the cylinder bore to the recess;
    a piston movably disposed in the cylinder bore;
    an operating member coupled to the piston to move the piston within the cylinder bore;
    a hydraulic reservoir tank fluidly connected to the cylinder bore, the hydraulic reservoir tank having an open bottom; and
    a diaphragm at least partially disposed inside the hydraulic reservoir tank and dividing the hydraulic reservoir tank into a hydraulic fluid chamber and an air chamber, the diaphragm covering the open bottom, the air chamber being at least partially located closer to the cylinder bore than the hydraulic fluid chamber,
    the diaphragm including a fitting portion disposed in the recess of the base member arid a diaphragm fluid passage extending through the fitting portion, the base fluid passage and the diaphragm fluid passage fluidly connecting the hydraulic fluid chamber to the cylinder bore.

2. The bicycle hydraulic operating device according to claim 1, wherein
    the diaphragm has a fluid passage fluidly connecting the hydraulic fluid chamber to the cylinder bore.

3. The bicycle hydraulic operating device according to claim 2, wherein
    the hydraulic reservoir tank includes a bleed port that is aligned with the fluid passage.

4. The bicycle hydraulic operating device according to claim 1, wherein
    the fitting portion is frictionally retained in the recess of the base member.

5. The bicycle hydraulic operating device according to claim 1, further comprising
    a seal member disposed between the recess of the base member and the fitting portion of the diaphragm.

6. The bicycle hydraulic operating device according to claim 1, wherein
    the base member includes an air passageway fluidly connecting the air chamber to outside of the base member.

7. The bicycle hydraulic operating device according to claim 1, wherein
    the diaphragm is sandwiched in between the base member and the hydraulic reservoir tank to limit movement of the diaphragm.

8. The bicycle hydraulic operating device according to claim 7, wherein
    the diaphragm includes a peripheral edge portion that is sandwiched in between the base member and the hydraulic reservoir tank.

9. The bicycle hydraulic operating device according to claim 1, wherein
    the hydraulic reservoir tank is bonded to the base member.

10. The bicycle hydraulic operating device according to claim 1, wherein
    the hydraulic reservoir tank is fixed to the base member by a fastenerless joint.

11. The bicycle hydraulic operating device according to claim 1, wherein
    the hydraulic reservoir tank and the base member are made of a resin material.

12. The bicycle hydraulic operating device according to claim 1, further comprising
    a handlebar mounting structure disposed on the base member.

13. The bicycle hydraulic operating device according to claim 1, wherein the operating member includes a lever pivotally mounted relative to the base member.

14. The bicycle hydraulic operating device according to claim 1, wherein
the base member is configured to be gripped by a user.

15. The bicycle hydraulic operating device according to claim 14, wherein
the base member includes a handlebar receiving recess arranged at a first end portion and a pommel portion arranged at a second end portion opposite to the first end portion.

16. The bicycle hydraulic operating device according to claim 1, further comprising
a shifting unit disposed on one of the base member and the operating member.

17. A bicycle hydraulic operating device comprising:
a base member including a cylinder bore;
a piston movably disposed in the cylinder bore;
an operating member coupled to the piston to move the piston within the cylinder bore;
a hydraulic reservoir tank fluidly connected to the cylinder bore; and
a diaphragm at least partially disposed inside the hydraulic reservoir tank and defining a hydraulic fluid chamber inside the hydraulic reservoir tank, the hydraulic fluid chamber being disposed between the diaphragm and an internal surface of the hydraulic reservoir tank, the diaphragm having a fluid passage fluidly connecting the hydraulic fluid chamber to the cylinder bore.

18. A bicycle hydraulic operating device comprising:
a base member including a cylinder bore;
a piston movably disposed in the cylinder bore;
an operating member coupled to the piston to move the piston within the cylinder bore;
a hydraulic reservoir tank fluidly connected to the cylinder bore, the entire hydraulic reservoir tank being disposed above the piston in a state where the bicycle hydraulic operating device is mounted to a bicycle; and
a diaphragm at least partially disposed inside the hydraulic reservoir tank and dividing the hydraulic reservoir tank into a hydraulic fluid chamber and an air chamber, the hydraulic fluid chamber being disposed between the diaphragm and an internal surface of the hydraulic reservoir tank, the air chamber being disposed between the diaphragm and the base member such that the air chamber is at least partially located below the fluid chamber in a state where the bicycle hydraulic operating device is mounted to the bicycle, the diaphragm being sandwiched in between the base member and the hydraulic reservoir tank to limit movement of the diaphragm.

* * * * *